(12) United States Patent
Suzuki et al.

(10) Patent No.: US 7,474,348 B2
(45) Date of Patent: Jan. 6, 2009

(54) IMAGE PHOTOGRAPHING SYSTEM HAVING DATA MANAGEMENT FUNCTION, DATA MANAGEMENT DEVICE AND MEDIUM

(75) Inventors: Makoto Suzuki, Kawasaki (JP); Harutaka Eguchi, Kawasaka (JP)

(73) Assignee: Fujitsu Limited, Kawasaki (JP)

( * ) Notice: Subject to any disclaimer, the term of this patent is extended or adjusted under 35 U.S.C. 154(b) by 865 days.

(21) Appl. No.: 09/788,387

(22) Filed: Feb. 21, 2001

(65) Prior Publication Data

US 2001/0015762 A1 Aug. 23, 2001

(30) Foreign Application Priority Data

Feb. 21, 2000 (JP) .............................. 2000-043661

(51) Int. Cl.
*H04N 5/222* (2006.01)
*H04N 5/225* (2006.01)
*G06F 3/048* (2006.01)

(52) U.S. Cl. .............................. 348/333.05; 348/207.1; 715/838; 715/732

(58) Field of Classification Search .............. 348/14.07, 348/207.1, 207.11, 211.8, 211.13, 231.6, 348/231.3, 333.02, 333.05, 333.11, 333.12; 345/721, 724, 838, 56, 634, 638; 715/731, 715/732, 838, 833
See application file for complete search history.

(56) References Cited

U.S. PATENT DOCUMENTS

| 5,161,025 | A |   | 11/1992 | Nakao ......................... 358/224 |
| 5,339,393 | A |   | 8/1994 | Duffy et al. ................... 395/161 |
| 5,859,623 | A | * | 1/1999 | Meyn et al. .................... 715/730 |
| 5,923,908 | A | * | 7/1999 | Schrock et al. .................. 396/85 |
| 5,933,137 | A |   | 8/1999 | Anderson .................... 345/328 |
| 5,943,050 | A | * | 8/1999 | Bullock et al. ......... 348/333.05 |
| 5,966,122 | A | * | 10/1999 | Itoh ............................ 348/239 |
| 5,973,691 | A |   | 10/1999 | Servan-Schreiber ......... 345/342 |
| 5,990,860 | A | * | 11/1999 | Takeuchi ..................... 345/667 |
| 6,028,603 | A | * | 2/2000 | Wang et al. .................. 715/776 |
| 6,233,015 | B1 | * | 5/2001 | Miller et al. ........... 348/333.05 |
| 6,310,648 | B1 | * | 10/2001 | Miller et al. ........... 348/333.05 |
| 6,317,141 | B1 | * | 11/2001 | Pavley et al. ................. 715/732 |
| 6,340,971 | B1 | * | 1/2002 | Janse et al. .................. 715/721 |

(Continued)

FOREIGN PATENT DOCUMENTS

EP 0 356351 A1 2/1990

(Continued)

OTHER PUBLICATIONS

Anonymous: "Taskbar Basics", Microsoft Internet Site, Online! Apr. 21, 1999. Retrieved from the Internet: <URL:www.microsoft.com/windows98/usingwindows/work/articles/811Nov/WRKfoundation4.asp> retrieved on Oct. 24, 2001! Paragraph 0003: Keep track of your work.

*Primary Examiner*—John M Villecco
(74) *Attorney, Agent, or Firm*—Staas & Halsey LLP

(57) ABSTRACT

An image photographing system capable of simply surely confirming a result of photographing when photographing an object and recording image data thereof, comprises an unit detecting a photographing instruction, an unit generating image data from an image when detecting the photographing instruction, and an unit displaying a screen configured by a first display area displaying the image, and a second display area displaying the image data generated based on the photographing instruction.

11 Claims, 18 Drawing Sheets

U.S. PATENT DOCUMENTS

| | | | |
|---|---|---|---|
| 6,359,649 B1 * | 3/2002 | Suzuki | 348/333.11 |
| 6,453,078 B2 * | 9/2002 | Bubie et al. | 382/305 |
| 6,515,704 B1 * | 2/2003 | Sato | 348/333.11 |
| 6,538,698 B1 * | 3/2003 | Anderson | 348/333.05 |
| 6,683,649 B1 * | 1/2004 | Anderson | 348/333.05 |
| 6,734,877 B1 * | 5/2004 | Honda et al. | 345/721 |
| 6,734,909 B1 * | 5/2004 | Terane et al. | 348/333.05 |
| 6,738,075 B1 * | 5/2004 | Torres et al. | 348/333.05 |
| 6,795,116 B1 * | 9/2004 | Akasawa | 348/231.6 |
| 6,879,342 B1 * | 4/2005 | Miller et al. | 348/333.05 |
| 6,943,841 B2 * | 9/2005 | Miyake et al. | 348/333.05 |
| 7,016,059 B1 * | 3/2006 | Baum et al. | 358/1.15 |
| 7,050,097 B2 * | 5/2006 | Schick et al. | 348/239 |
| 7,051,291 B2 * | 5/2006 | Sciammarella et al. | 715/838 |
| 7,152,210 B1 * | 12/2006 | Van Den Hoven et al. | 715/723 |
| 2002/0070982 A1 * | 6/2002 | Hill et al. | 345/835 |
| 2003/0025811 A1 * | 2/2003 | Keelan et al. | 348/207.1 |
| 2003/0030729 A1 * | 2/2003 | Prentice et al. | 348/207.1 |
| 2003/0160874 A1 * | 8/2003 | Kuroiwa | 348/333.05 |
| 2006/0098111 A1 * | 5/2006 | Goh et al. | 348/333.05 |

FOREIGN PATENT DOCUMENTS

| | | | |
|---|---|---|---|
| EP | 0860981 A2 | | 8/1998 |
| JP | 6-348799 | | 12/1994 |
| JP | 8-313217 | | 11/1996 |
| JP | 9-294226 | | 11/1997 |
| JP | 9-297750 | | 11/1997 |
| JP | 10-285520 | | 10/1998 |
| JP | 11-327721 | | 11/1999 |
| JP | 11308488 A | * | 11/1999 |

* cited by examiner

IMAGE PHOTOGRAPHING SYSTEM HAVING DATA MANAGEMENT FUNCTION, DATA MANAGEMENT DEVICE AND MEDIUM

BACKGROUND OF THE INVENTION

The present invention relates to an image photographing system and a data management device.

A digital image photographing system such as a digital camera etc for recording an image of an object in the form of digital data, is now generally used. The digital image photographing system is constructed such that the digital image data generated by a multiplicity of CCD imaging devices or MOS imaging devices (which will hereinafter simply be referred to as imaging devices), are stored in a built-in memory and a sub storage unit. A user is able to confirm the stored digital image data by displaying the same data on a liquid crystal display. further, the user transfers the digital image data of a photographed image to a personal computer etc, and may manage the data as a file of the computer.

Moreover, there is proposed a digital image photographing system of such a type that a so-called mobile terminal is connected to a digital camera (CCD camera), and the digital image data of the photographed image are recorded directly on a storage device of the mobile terminal.

In this type of digital image photographing system, the digital image formed on the imaging device is normally displayed in real time on a liquid crystal display. Then, upon detecting a photographing instruction given from the user, the digital image photographing system takes in the digital image formed on the imaging device at that time, and records the image on the memory or the sub storage medium.

In this type of digital image photographing system, however, if the user attempts to confirm the photographed image, the recorded image data are read from the memory etc and displayed on the liquid crystal display, and hence there is a necessity of switching a screen from a normal photographing mode to a management mode. Note that this management mode is possible of edit operations such as displaying and deleting the recorded image data, and changing a display order thereof.

That is, a real time image is displayed in the photographing mode, while in the management mode, the image data (still image) obtained is displayed or deleted and the display order is changed.

Then, the screen corresponding to each of those modes can be switched corresponding to a changeover of mode. Therefore, the realtime image is merely displayed when in the photographing mode, and the user is unable to grasp what sort of photographed image data exists.

Further, it is required that the photographing mode be switched to the management mode for the edit operation such as changing the display order of the photographed image data, resulting in a low usability.

Moreover, as explained above, in the digital camera etc, the digital image data on the imaging device is stored on the memory etc at a timing specified by the user, and therefore the user does not sense the real photographing in some cases.

Furthermore, in the personal computer and the mobile terminal for managing generally data such as the image data and so on, a data list is displayed using an index image involving the use of a reduced image and a name of file (which will hereinafter be called a data identifying element) stored with the data. A display order is, however, determined by sorting the data with pre-defined keys such as a file name, a date etc. Further, if the data that should be managed is newly added, this piece of data is placed in its display order at a tail of the data managed.

Therefore, if the user wishes to display the data in a desired order and thus manages the data, the user must intentionally set the key, e.g., the file name for determining the display order.

Moreover, if there are a multiplicity of items of data to be managed, it is difficult to display all the items of data on one screen. In such a case, if a new piece of data to be managed is added, the added data is to be displayed at a tail of a list of the data identifying elements. Hence, it might happen that the newly added data is not displayed within the list of data identifying elements displayed on the screen at the present. Accordingly, the user must display the vicinity of the tail of the data identifying element list by scrolling the screen in order to confirm the added data concerned.

SUMMARY OF THE INVENTION

It is a primary object of the present invention, which was devised to troubleshoot the problems inherent in the prior art described above, to provide an image photographing system capable of simply surely confirming a result of photographing when photographing an object and recording image data thereof.

It is another object of the present invention to provide a data management technology capable of easily grasping management target data when managing the image data or a multiplicity of items of data generated on a computer.

It is a further object of the present invention to enhance an operation usability to a user in order to confirm the result of photographing and manage the data.

To accomplish the above objects, according to one aspect of the present invention, an image photographing system comprises an unit detecting a photographing instruction, an unit generating image data from an image when detecting the photographing instruction, and an unit displaying a screen configured by a first display area displaying the image, and a second display area displaying the image data generated based on the photographing instruction.

The image photographing system may further comprise an unit retaining display image data segments that show the image data displayed in the second display area, and the second display area may be capable of displaying plural pieces of image data generated by the photographing instruction on the basis of the display image data segments.

The image data generated fresh when detecting the photographing instruction may be displayed in a predetermined position in the second display area.

When the newly generated image data is displayed in the predetermined position in the second display area, the image data already displayed may be shifted frame by frame in a predetermined direction and thus displayed.

The image photographing system according to the present invention may further comprise an unit inputting the image to be displayed in the first display area from an outside device. This outside device may be an image acquisition device generating an image by photographing an object.

According to another aspect of the present invention, a data management device comprises a display screen arranging and displaying a predetermined number of data identifying elements to identify data wherein if the number of pieces of data to be managed exceeds the number of pieces of data displayable on the display screen and if data to be managed is added, the added data is inserted in a layout of the data identifying elements displayed.

According to another aspect of the present invention, there is provided a readable-by-computer recording medium recorded with a program executed by a computer to actualize any of the above functions.

As explained above, the system according to the present invention is constructed so that the photographing target image and the image data (still image) generated by the photographing process from the image concerned are displayed on the same screen, thereby eliminating a necessity of switching between the photographing process and browsing of the photographed image data. This enhances a usability.

Moreover, according to the present invention, the photographing target image and the photographed image are displayed on the same screen, and hence the user is able to easily surely confirm a result of photographing.

Further, according to the present invention, if the number of pieces of data to be managed exceeds the number of pieces of data displayable on the display screen and if data to be managed is added, the added data is inserted in a layout of the data identifying elements displayed. The user is therefore able to easily grasp the management target data.

DETAILED DESCRIPTION OF THE PREFERRED EMBODIMENTS

Preferred embodiments of the present invention will hereinafter be described in conjunction with the accompanying drawings.

First Embodiment

A first embodiment of the present invention will be discussed with reference to FIGS. 1 through 13.

Figure 1:
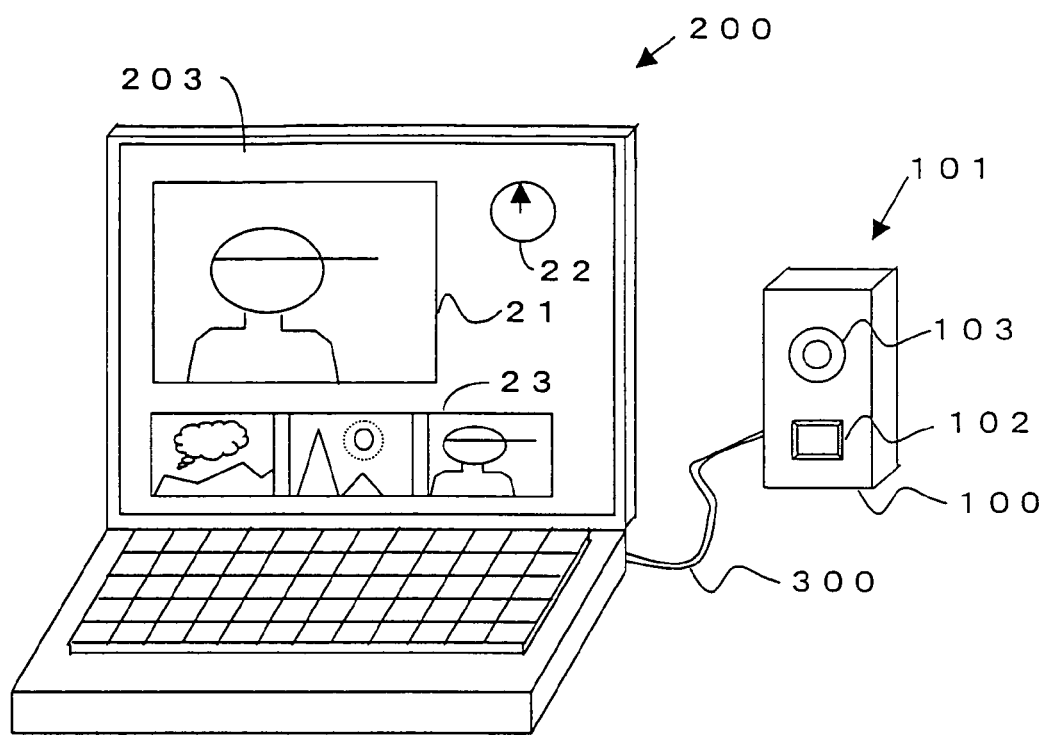
FIG. 1 is a view illustrating an external configuration of an image photographing system in a first embodiment of the present invention.
Figure 2:
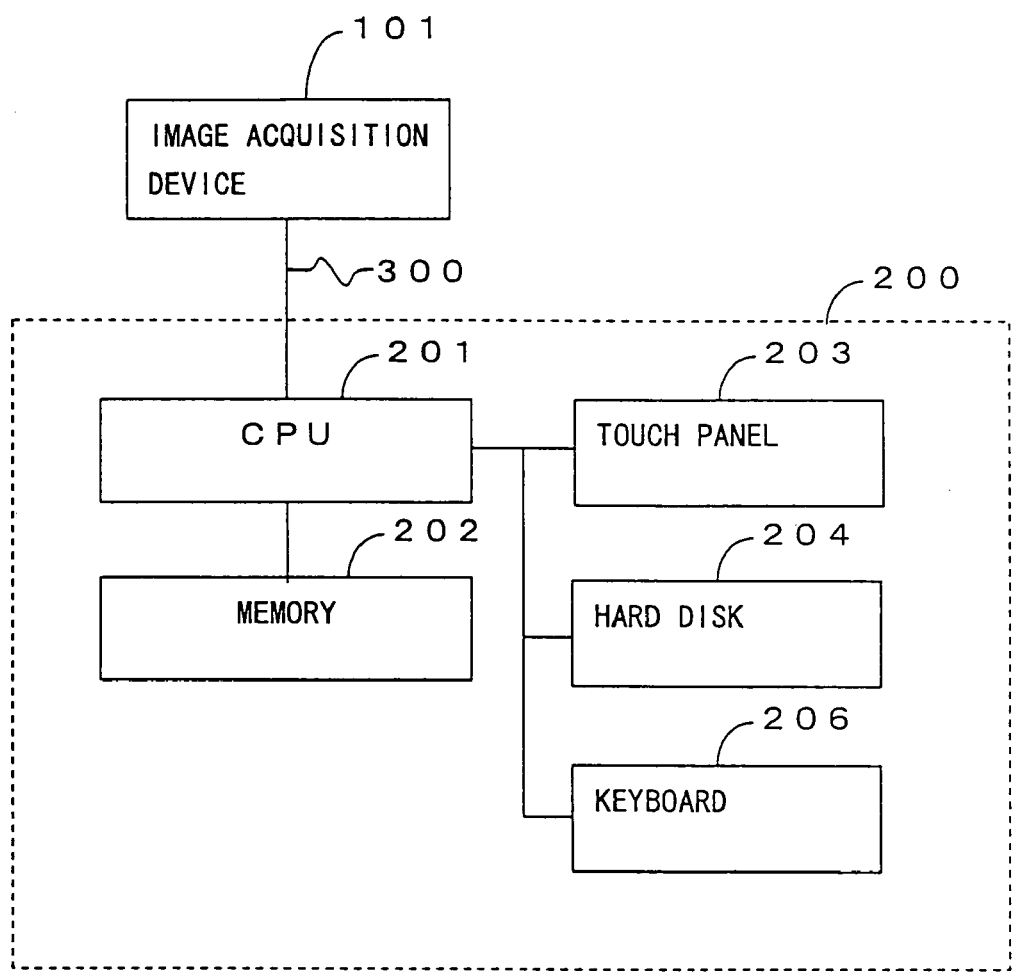
FIG. 2 is a block diagram showing a hardware architecture of the image photographing system.
Figure 3:
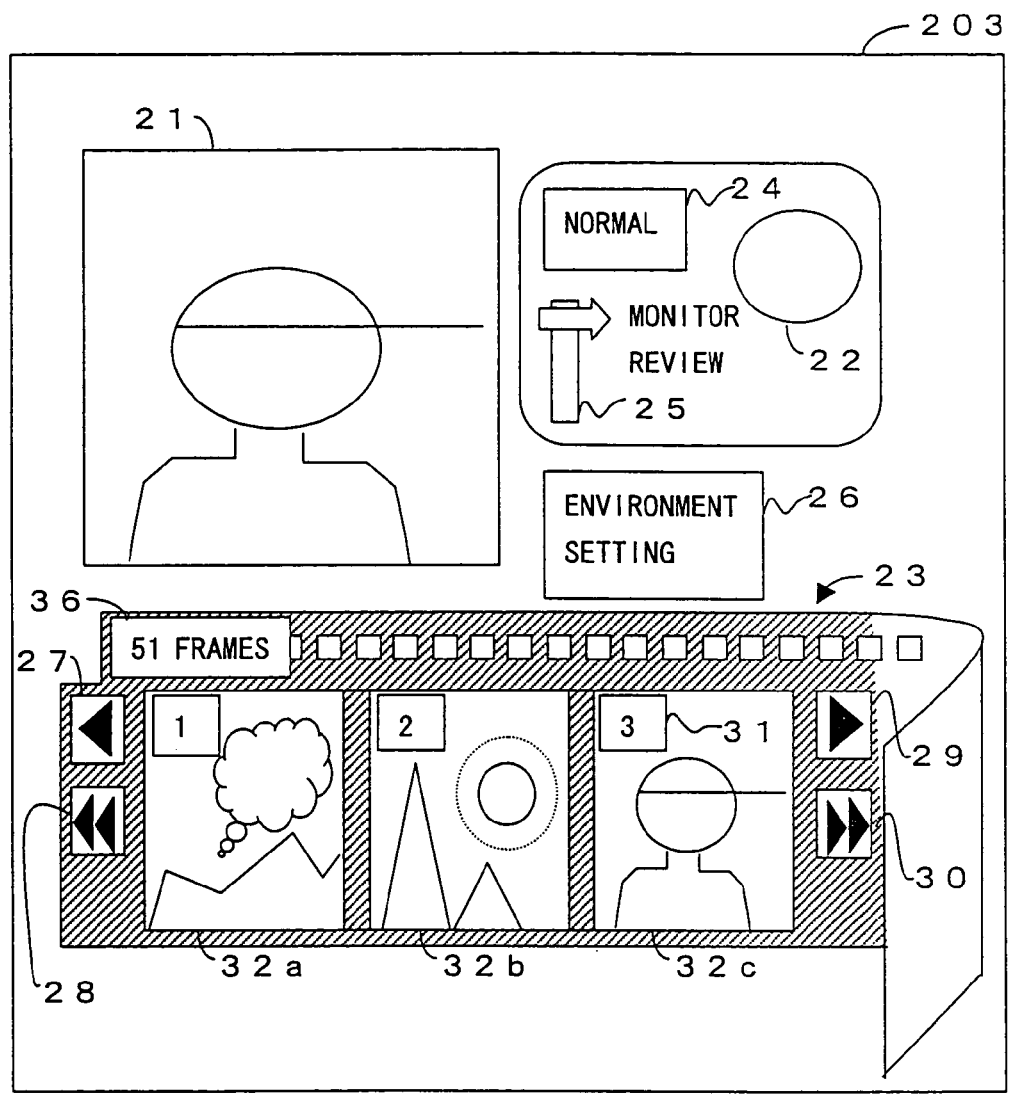
FIG. 3 is a view showing a layout on a screen of a touch panel 203.
Figure 4:
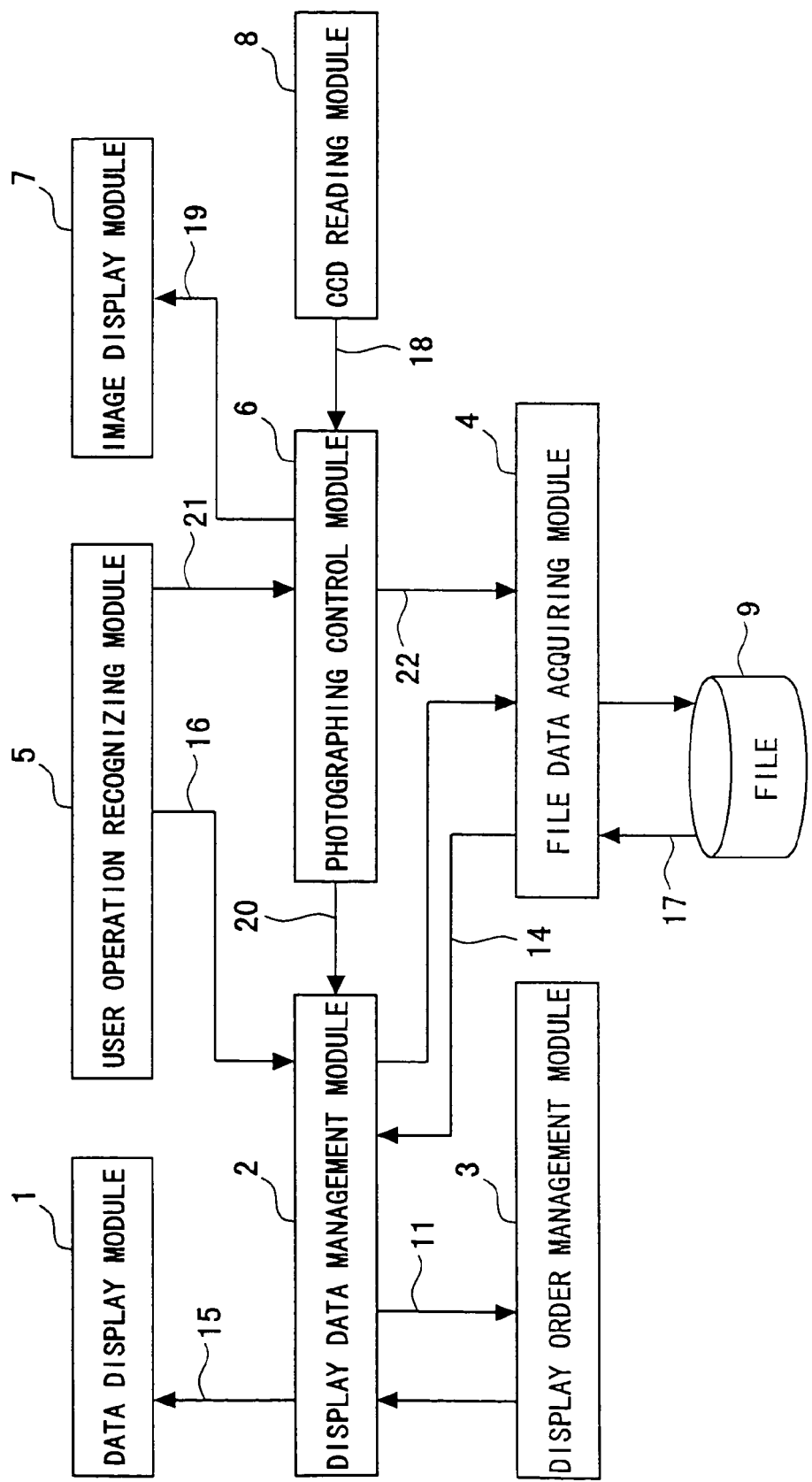
FIG. 4 is a block diagram showing functions of a control program.
Figure 5:
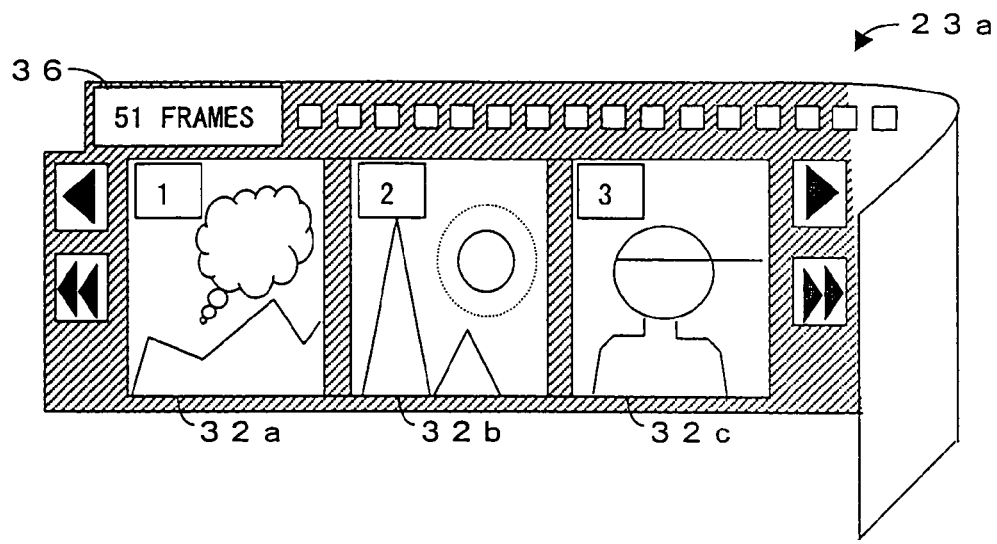
FIG. 5 is a view showing an image transition on the screen when in a new data adding process.
Figure 5:
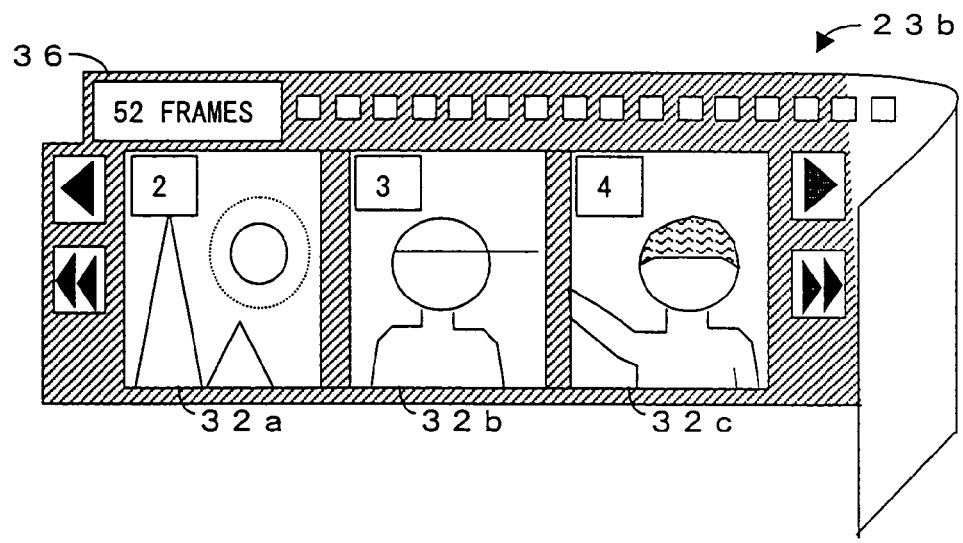
Figure 6:
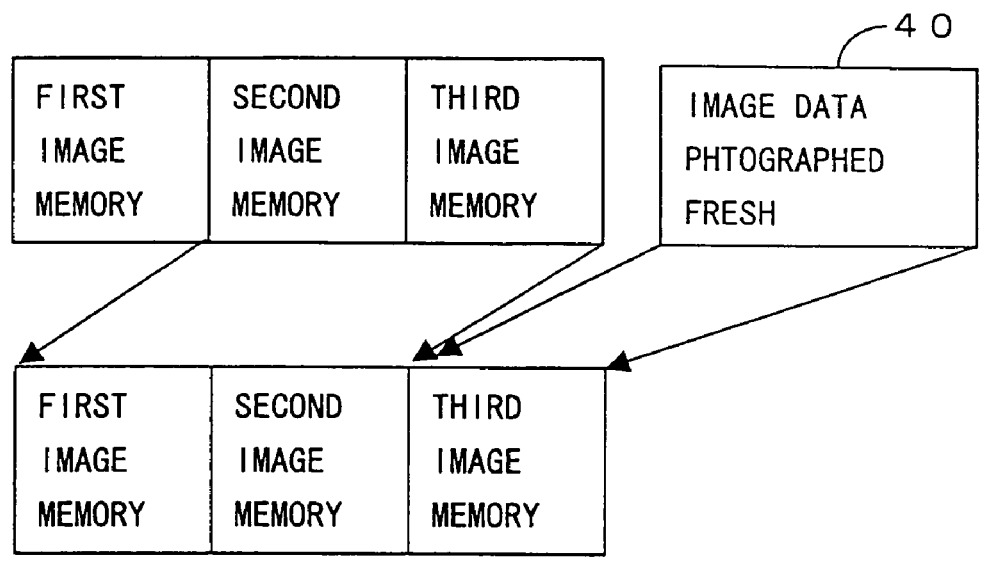
FIG. 6 is a diagram showing an operation of an image memory when in the new data adding process
Figure 7:
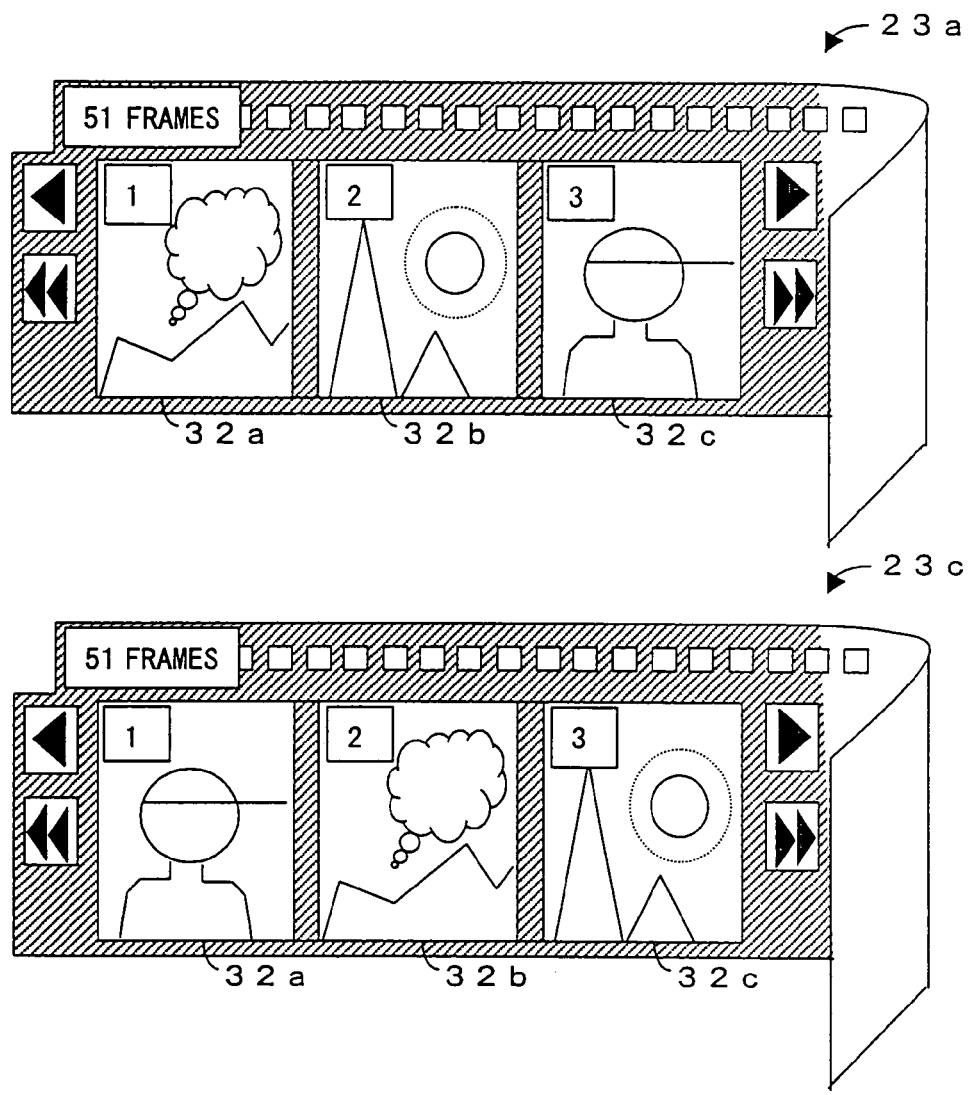
FIG. 7 is a view illustrating an image transition when in a display sequence changing process.
Figure 8:
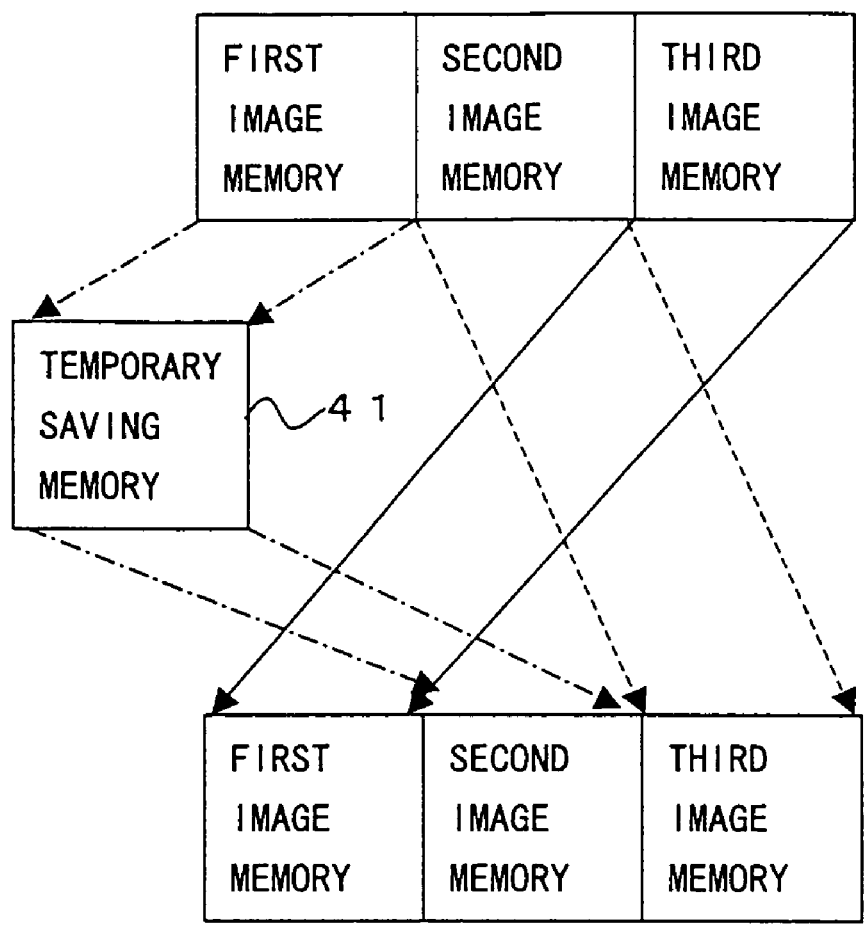
FIG. 8 is a diagram showing an operation of the image memory when in the display sequence changing process.
Figure 9:
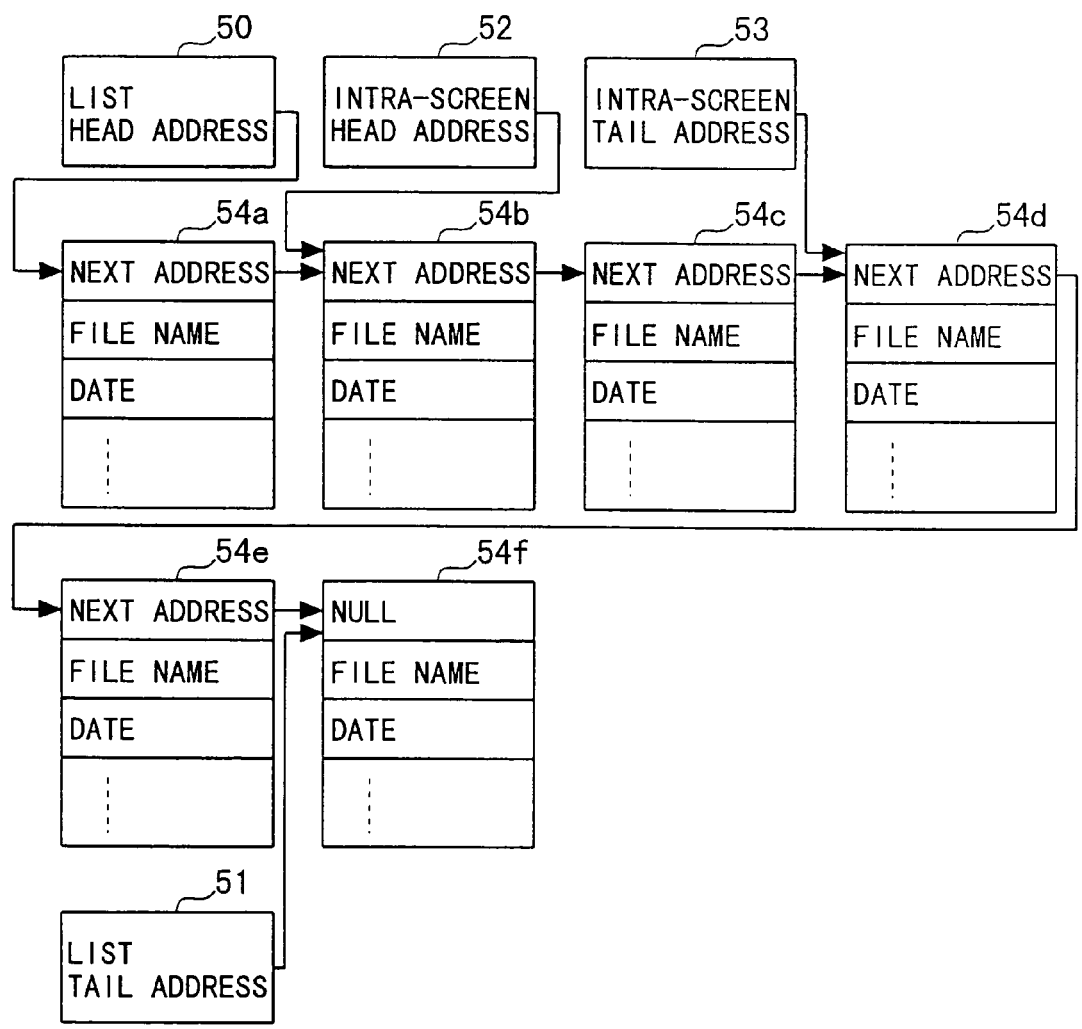
FIG. 9 is a diagram showing a structure of data handled by a display sequence management module 3.

FIG. 1 is a view showing an external configuration of an image photographing system in the first embodiment. FIG. 2 is a block diagram showing a hardware architecture of this image photographing system. FIG. 3 is a view showing a layout on a screen of a touch panel 203 provided in the image photographing system. FIG. 4 is a block diagram showing functions incorporated into a control program of the image photographing system 200. FIG. 5 is a view illustrating an image transition on the screen when in a new data adding process. FIG. 6 is a diagram showing an operation of an image memory when in the new data adding process. FIG. 7 is a view illustrating an image transition when in a display sequence changing process. FIG. 8 is a diagram showing an operation of the image memory when in the display sequence changing process. FIG. 9 is a diagram showing a structure of data handled by a display sequence management module 3 shown in FIG. 4. FIGS. 10 to 13 are flowcharts showing processes of the control program executed by a CPU 201 shown in FIG. 2.

<Hardware Architecture>

FIG. 1 is the view illustrating the external configuration of the image photographing system in the first embodiment. The image photographing system is constructed of an image acquisition device 101 and a mobile terminal 200 that are connected to each other by a universal serial bus (which will hereinafter be abbreviated to USB) cable 300.

The image acquisition device 101 includes a button 102 and a lens 103 for forming an image inside a body 100, which are provided on the front side of the body 100. Further, the image acquisition device 101 has an unillustrated CCD imaging device inwardly of the body 100.

The lens 103 functions to form an image of an object on the CCD imaging device built in the image acquisition device body 100. The image formed on the CCD imaging device is read in real time by the mobile terminal 200 via the USB cable 300.

The button 102 detects a depression by a user, and transmits it to the mobile terminal via the USB cable 300.

FIG. 2 is the block diagram illustrating the hardware architecture of the image photographing system. As shown in FIG. 2, the mobile terminal 200 includes a CPU 201 for reading digital image signals generated by the image acquisition device 101 via the USB cable 300 and thus controlling the photographing, a memory 202 for storing the control program executed by the CPU 201 and the data processed by the CPU 201, a touch panel 203 for displaying the data in accordance with an instruction given from the CPU 201 and detecting a user's operation, a hard disk 204 for recording the data, and a keyboard 206.

The CPU 201 controls the photographing by executing the control program stored in the memory 202. To be more specific, the CPU 201 reads in real time the data of the image formed on the unillustrated CCD imaging device through the lens 103, and writes the image data to the memory 202. The image data written to the memory 202 are displayed on the touch panel 203.

Further, in a normal state, the CPU 201 monitors the button 102 on the basis of an interruption processing function. That is, when the user depresses the button 102 and then releases it, the CPU 201 detects this operation in accordance with an interruption processing program unillustrated. Upon detecting the depression and the release of the button 102, a photographing process is carried out.

The memory 202 stores the program executed by the CPU 201 and the data processed by the CPU 201.

The touch panel 203 is constructed of a combination of a liquid crystal display and a sensor for detecting a position where the user depresses. An image read from the CCD imaging device and icons for guiding the user's operation, are displayed on this touch panel What is well known as a sensor of the touch panel 203 may be a pressure sensitive type sensor, an electrostatic type sensor and an ultrasonic type sensor.

Further, the device for detecting the operating position of the user in terms of actualizing the present invention is not limited to the touch panel, and may be, as a matter of course, other devices such as a mouse, a keyboard, etc.

The hard disk 204 records the data of the photographed image.

<Layout on Screen>

FIG. 3 illustrates a layout on the screen of the touch panel 203. An image display area 21, a photographed button icon 22, a photographed image display frame area 23, a photographing mode menu 24, a display mode menu 25 and an environment setting menu 26, are displayed on a liquid crystal display of the touch panel 203.

In the image display area 21 (corresponding to a first display area), a display mode is changed by the display mode menu 25. The display mode is categorized into a monitor mode and a review mode.

In the monitor mode, the latest image photographed by the image acquisition device 101 is displayed on the image display area 21. This image is read in real time to the mobile terminal 200 from the image acquisition device 101.

On the other hand, in the review mode, digital data of the already-photographed image, which has been stored in the hard disk 204, is displayed on the image display area 21.

The photographing button icon 22 serves to detect a photographing instruction of the user through the touch panel 203. The user instructs the photographing through the photographing button icon 22 or the button 102 provided on the image acquisition device 101.

The photographed image display frame area 23 (corresponding to a second display area) includes, a film frame area simulating a configuration of a real film, three pieces of image display frames 32a, 32b, 32c segmented within this film frame area, a photograph count indicating portion 36 for indicating the number of images photographed, a leftward frame feed button 27 provided leftwards adjacent to the image display frame 32a provided at the left end, a leftward frame fast feed button 28 provided under the leftward frame feed button 27, a rightward frame feed button 29 provided rightwards adjacent to the image display frame 32c provided at the right end, and a rightward frame fast feed button 30 provided under the rightward frame feed button 29.

Three frames of the digital photographed image data are reduced and displayed in the image display frames 32a, 32b, 32c. the images displayed in the image display frames 32a, 32b, 32c are called frame images. In the review mode, when the user selects a desired frame image through the touch panel 203, this selected image is enlarged and displayed in the image display area 21. Namely, the image display frames 32a, 32b, 32c provide a function of previewing each of the photographed images.

A frame number (1 or 2 or 3 in FIG. 3) is provided at a left upper corner of each of the image display frames 32a, 32b, 32c. When the user depresses the leftward frame feed button 27 or the leftward frame fast feed button 28, the images in the image display frames 32a, 32b, 32c are fed in the left direction, and at the same time the frame number is sequentially incremented.

When the user depresses the rightward frame feed button 29 or the rightward frame fast feed button 30, the images in the image display frames 32a, 32b, 32c are fed in the right direction, and at the same time the frame number is sequentially decremented.

Note that calculations of the frame numbers involve the use of the number (51 pieces in FIG. 3) of images (managed at the present) obtained by the photographing, the position in the sequence of images, the number (3 pieces in FIG. 3) of images displayed at the present in the photographed image display frame area 23, and positions of the images displayed at the present in the photographed image display frame area 23. These items of data are retained on the memory 202. Then, corresponding to a new addition of the image obtained by the photographing process or to an insertion/transfer of the image by operating a variety of buttons, the frame number is calculated based on a position where the new frame image is inserted or a position to which the existing frame image is transferred.

The number of the digital image data (the number of frames) stored at the present is displayed in the photograph count indicating portion 36.

The photographing mode menu 24 is used for switching a photographing mode to a normal mode or a consecutive photographing mode.

The display mode menu 25 is used for switching a mode of the image display area 21 to a monitor mode or a review mode.

The environment setting menu 26 is used for setting an environment of the image photographing system, such as setting the number of consecutive photographs, a consecutive photographing interval, etc.

<Functional Architecture>

FIG. 4 is the block diagram showing the functions of the control program executed by the CPU 201. This control program consists of a data display module 1 for displaying the data and images on the touch panel 203, a display data management module 2 for specifying the image data to be displayed by this data display module 1, a display order management module 3 for managing a display order of the images to be displayed in the image display frames 32a, 32b, 32c, a file data acquiring module 4 for accessing to the recorded digital image data, a user operation recognizing module 5 for recognizing a user's operation, a photographing control module 6 for controlling the photographing in accordance with the user's operation, an image display module 7 for momentarily displaying the digital images generated by the CCD imaging device in the monitor mode and displaying the images photographed in the review mode, and a CCD reading module 8 for reading the digital image data from the CCD imaging device.

The data display module 1 displays the frame image in the photographed image display frame area 23, a name of a file stored with the frame image, or file attributes (a photographing date, an inter-frame relation between the consecutive photographing and panorama photographing).

The display data management module 2 indicates the data display module 1 to display which digital image data and which order this piece of digital image data is set, in the photographed image display frame area 23 (signal 15). The order herein is an order in which the digital photographed image data are arranged.

The display order management module 3 manages an order of the digital photographed image data files.

The file data acquiring module 4 stores in a file 9 the digital image data read by the CCD reading module 8 under the control of the photographing module 6. The file data acquiring module 4 and the CCD reading module 8 in combination correspond to an unit generating image data.

Further, in response to a request given from the display data management module 2 (or the photographing control module 6), the file data acquiring module 4 reads the digital image data and attributes of the same data from the file 9 (signal 17).

The user operation recognizing module 5 recognizes which data is transferred and where, and which icon is depressed by the user's operation, e.g., drag-and-drop on the touch panel 203. The drag-and-drop herein connotes an operation of moving(dragging) an operation target displayed on the screen in a desired direction while pinpointing the operation target by pressing, and releasing (dropping) it in a desired position on the touch panel 203 by use of the mouse.

The photographing control module 6 controls reading the data from the unillustrated CCD photographing device, and the display on the image display area 21. This photographing control module 6 and the data display module 1 in combination correspond to an unit displaying a screen.

In the monitor mode, the photographing control module 6 momentarily reads the digital image data from the unillustrated CCD imaging device through the CCD reading module 8 (signal 18), and transfers the same data to the image display module 7 (signal 19). The image display module 7 momentarily displays the digital image data in the image display area 21 on the touch panel 203.

In this state, the photographing control module 6, when receiving a photographing instruction (signal 21) from the user operation recognizing module 5 (corresponding to an unit detecting a photographing instruction), transfers to the file data acquiring module 4 the digital image data read from the CCD imaging device (signal 22). As a result, the digital image data are stored as a file in the hard disk 204.

At this time, a name of the stored file is transferred to the display data management module 2 (signal 14). The display data management module 2 sends, to the display order management module 3, the order of the digital image data that is displayed in the image display frame 32c provided at the right end on the touch panel 203 and the file name of the digital image data stored fresh (signal 11). As a consequence, there is registered the file name of the digital image data stored fresh next to the order corresponding to the image display frame 32c provide at the right end at the present.

On the other hand, the display data management module 2 shifts the order by one frame, in which the images should be displayed in the photographed image display frame area 23, and notifies the data display module 1 of this new order (signal 15). The frame images in the photographed image display frame area 23 are thereby shifted leftward frame by frame, and a frame image of the digital image data stored fresh is displayed in the tail frame (in a position corresponding to the right-end image display frame 32c).

In the review mode, the photographing control module 6 reads the digital image data corresponding to a specified-by-the-user frame image in the photographed image display frame area 23 through the file data acquiring module 4, and transfers the same data to the image display module 7. As a result, the frame image specified by the user is enlarged and displayed in the image display area 21 on the touch panel 203. The process of setting the digital image data of the newly photographed image under the management of the display order management module 3 and displaying the digital image data in the image display frame 32c in the way described above, is termed a new data adding process.

FIG. 5 shows an image transition on the screen when in the new data adding process. The photograph count indicating portion 36 in a photographed image display frame area 23a indicates that the number of photographs is 51 at the present. Further, three top images (with the frame numbers 1, 2 and 3) among the 51 pieces of images are displayed in the photographed image display frame area 23a. In this state, when detecting the photographing instruction of the user, the data of the unillustrated CCD imaging device are given a predetermined file name and stored in the hard disk 204.

The images displayed in the photographed image display frame area 23a are shifted frame by frame and thus rearranged as displayed in a photographed image display frame area 23b. Namely, the image with the frame number 1 is shifted leftward with no display. Further, the image with the frame number 2 is shifted to the left-end position (corresponding to the image display frame 32a). Moreover, the image with the frame number 3 is shifted to the central position (corresponding to the image display frame 32b). Furthermore, an image with the frame number 4 which is photographed just now is inserted in the right-end position (corresponding to the image display frame 32c).

FIG. 6 shows the memory operation when in the new data adding process. As shown in FIG. 6, the frame images in the three frames in the photographed image display frame area 23 are retained in first through third image memories. In the new data adding process, the CPU 201 at first copies the data in the second image memory to the first image memory. Next, the CPU 201 copies the data in the third image memory to the second image memory. Further, the CPU 201 copies image data 40 of a newly photographed image to the third image memory. With the memory operation described above, the image transition on the screen is actualized as shown in FIG. 5.

FIG. 7 illustrates the image transition on the screen when in the display order changing process. Referring to FIG. 7, as in FIG. 5, three top images (with the frame numbers 1, 2 and 3) among the 51 pieces of images are displayed in the photographed image display frame area 23a.

Now, when the user drags the image (displayed in the image display frame 32c) (dragging being an operation of pulling the image in a desired direction while depressing it on the touch panel 203) with the frame number 3 and drops the image (releases it from being depressed) on the touch panel 203, as displayed in a photographed image display frame area 23c, the image with the frame number 3 is shifted to the position indicated by the frame number 1.

FIG. 8 shows the memory operation when in the display order changing process. As shown in FIG. 8, three pieces of frame images before executing the display order changing process are retained in the first through third memories. Upon detecting the drag & drop operation, the CPU 201 copies the data in the first image memory to a temporary saving memory 41. Next, the CPU 201 copies the data in the third image memory to the first memory. Subsequently, the CPU 201 copies the data in the second image memory to the third memory. Then, the CPU 201 copies the data in the temporary saving memory 41 to the second memory. This memory operation enables the image transition on the screen shown in FIG. 7 to be actualized.

FIG. 9 shows a data structure managed by the display order management module 3. This data structure is generally known as a list structure. The list structure represents an order relation between a plurality of data elements linked by next addresses 54a, 54b, 54c and so on. According to this list structure, a data element of which a next address 54f is NULL, is the tail data element.

Each data element based on this data structure retains a file name, a date, etc in addition to the next address (54a, etc). Herein, the file name is a name of a file for storing the digital image data. The date is a photographing date when the digital image data are created.

Based on this list structure, the head data element is indicated by a list head address 50. Further, the tail data element is indicated by a list tail address 51.

On the other hand, the data elements corresponding to the digital image data displayed in the photographed image display frame area 23, are indicated by an intra-screen head address 52 and an intra-screen tail address 53.

The display order management module 3, when given an instruction to add a new piece of data or change the display order, changes the display order of the files that store the digital image data by operating the data structure illustrated in FIG. 9.

<Operation and Effect>

FIGS. 10 through 13 show the processes (recognition of operation for photographing process and the order changing process) of the control program executed by the CPU 201 of the mobile terminal 200. The CPU 201 provides a function as the image photographing system by executing the control program.

In the normal state, the CPU 201 is in a wait-for-event state (S1). In terminology, the "event" implies a factor for making a control state of the CPU 201 be changed. When the event occurs, the CPU 201 judges a category of this event.

To start with, the CPU 201 judges whether the event concerned is a photographing event or not (S2). The photographing event is a photographing instruction given by the user. The photographing event occurs when the user depresses the button 102 of the image acquisition device 101 or depresses the photographing button 22 on the touch panel 203. That is, upon depressing the button 102 etc, the CPU 201 executes an interrupting process, and a detection of depression on the button is transmitted to the CPU 201.

When detecting the photographing event (Yes in S2), the CPU 201 executes the photographing process (S3).

Whereas if not the photographing event, the CPU 201 judges whether or not the event concerned is a display order change event (S4). If the user instructs a change in the display order in the photographed image display frame area 23 on the touch panel 203, this display order change event occurs.

When detecting the display order change event (Yes in S4) the CPU 201 executes a display order changing process (S5). If not the display order change event, the CPU 201 executes nothing and reverts to the wait-for-event state (S1).

Figure 10:
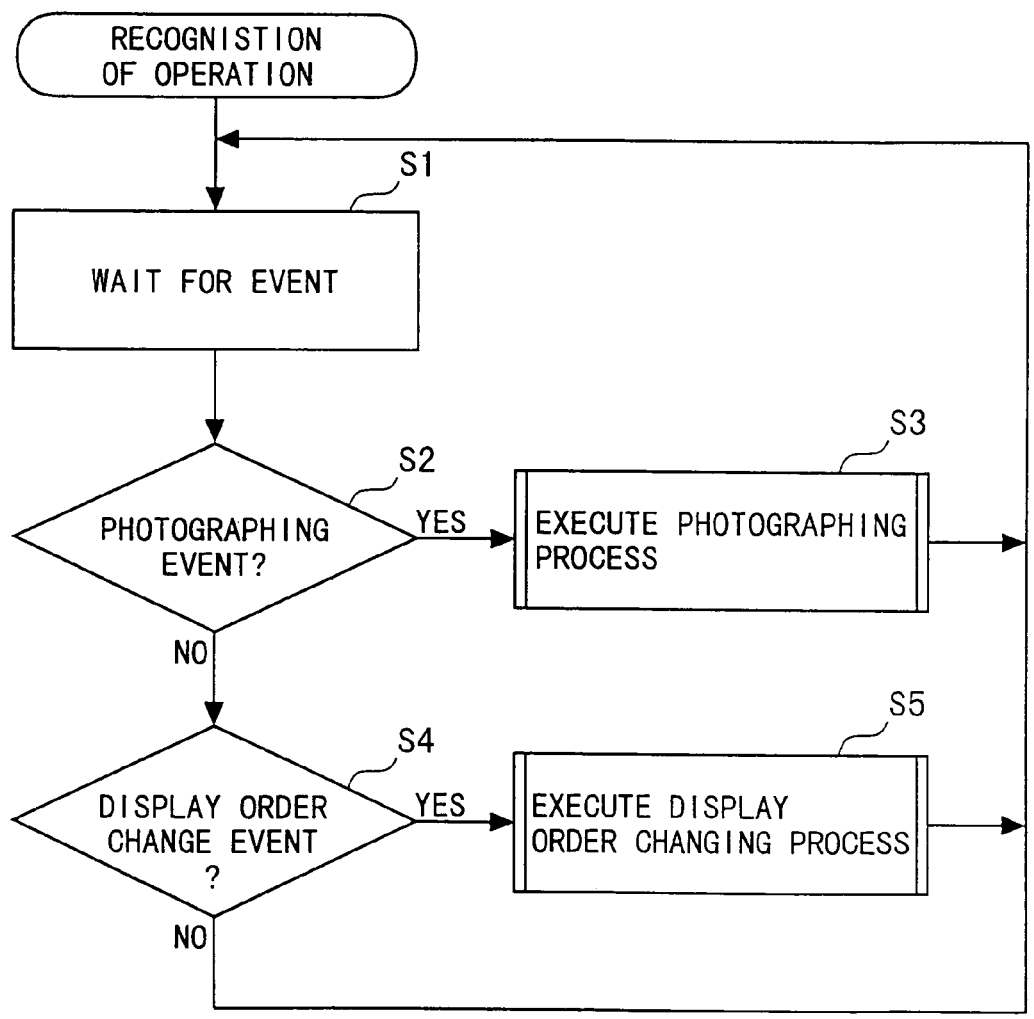
FIG. 10 is a flowchart (1) showing processes of the control program.
Figure 11:
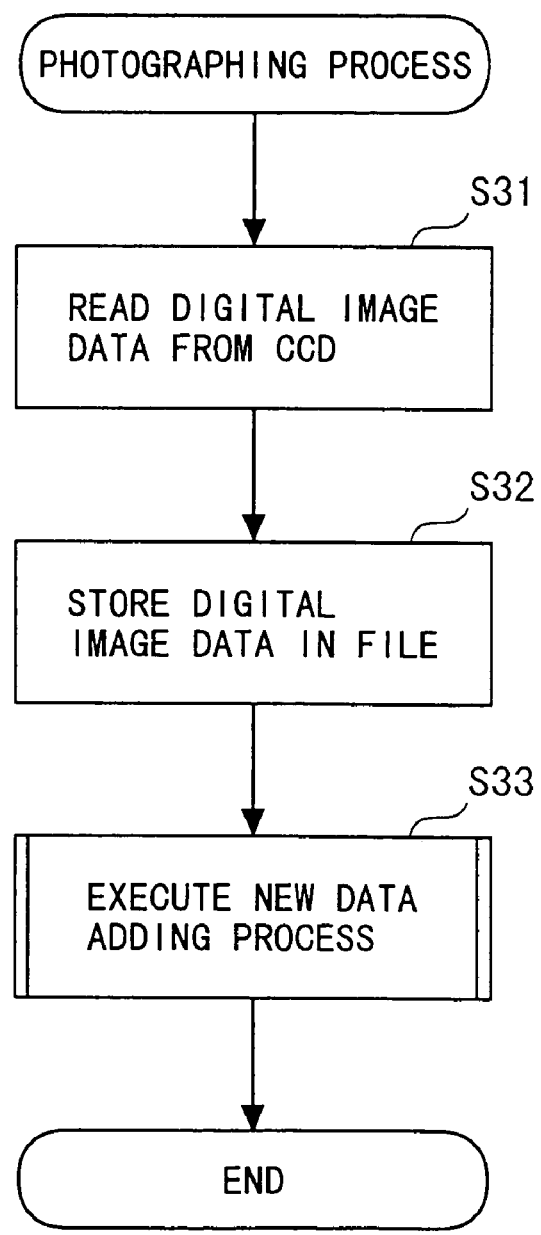
FIG. 11 is a flowchart (2) showing the processes of the control program.

FIG. 11 shows the photographing process (S3 in FIG. 10) executed by the CPU 201. At first, the CPU 201 reads the digital image data from the CCD imaging device (S31). Next, the CPU 201 stores the digital image data given a predetermined file name in the hard disk 204 (S32). Subsequently, the CPU 201 executes a new data adding process in order to add the file name stored therein to the list structure shown in FIG. 9 (S33).

Figure 12:
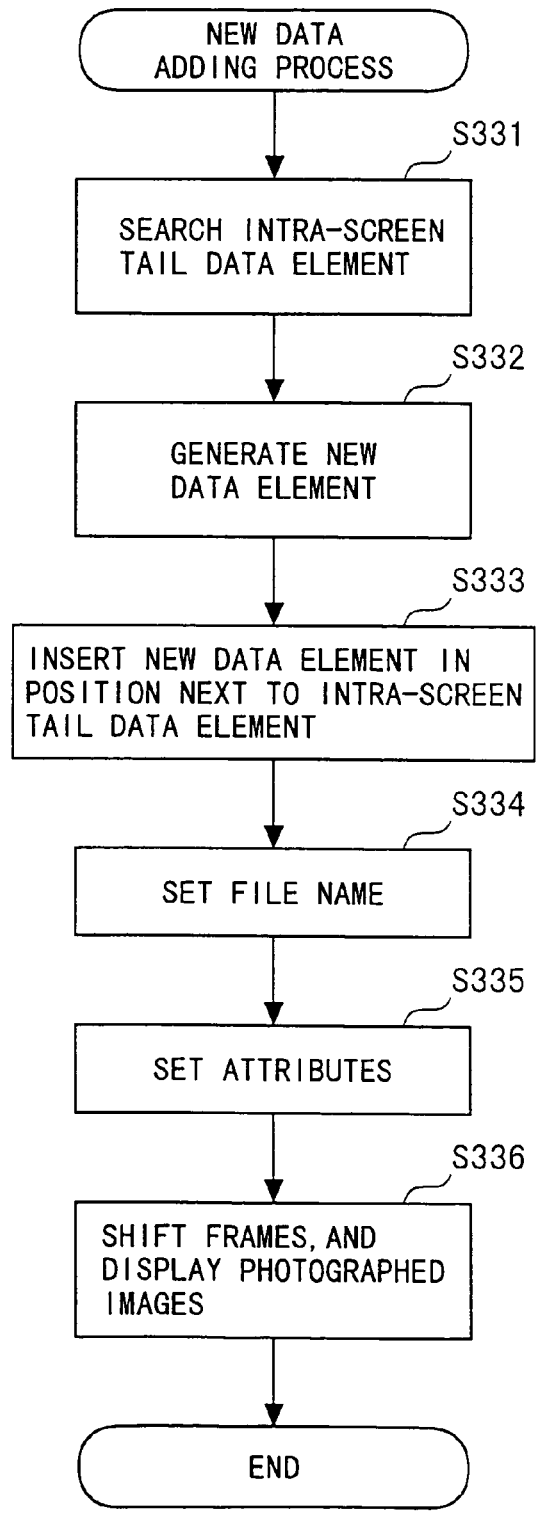
FIG. 12 is a flowchart (3) showing the processes of the control program.

FIG. 12 shows the new data adding process (S33 in FIG. 11). In the new data adding process, the filename of the digital image data of the photographed image is registered in the list structure managed by the display order management module 3.

To begin with, the CPU 201 obtains from the list structure the data element corresponding to the frame image positioned rightward most (which is displayed in the image display frame 32c) among the frame images displayed on the touch panel 203 (S331). This data element can be also obtained from the intra-screen tail address 53 in FIG. 9. This data element is called an intra-screen tail data element.

Next, the CPU 201 ensures a region for a new data element on the memory 202, and generates the new data element (S332).

Next, the CPU 201 inserts the new data element in a position next to the intra-screen tail data element, and rewrites a next address held by the intra-screen tail data element so that the order of the data element matches to this arrangement, and sets a next address held by the new data element (S333).

Subsequently, the CPU 201 sets a name of the file stored with the digital image data in the process in S32 (S334). Furthermore, attributes such as the photographing date etc are set in this new data element (S335).

Moreover, the next address indicated by the data element corresponding to the image positioned in the image display frame 32c before the photographing process, is rewritten into the address of the data element added in the photographing process. Further, the next address indicated by the data element with respect to the new image added, is set to the address of the data element of the image arranged in the display order next to the image positioned in the image display frame 32c.

Further, frames in the photographed image display frame area 23b are shifted. Then the newly photographed image is displayed (S336). This process is carried out by the memory operation shown in FIG. 6.

Figure 13:
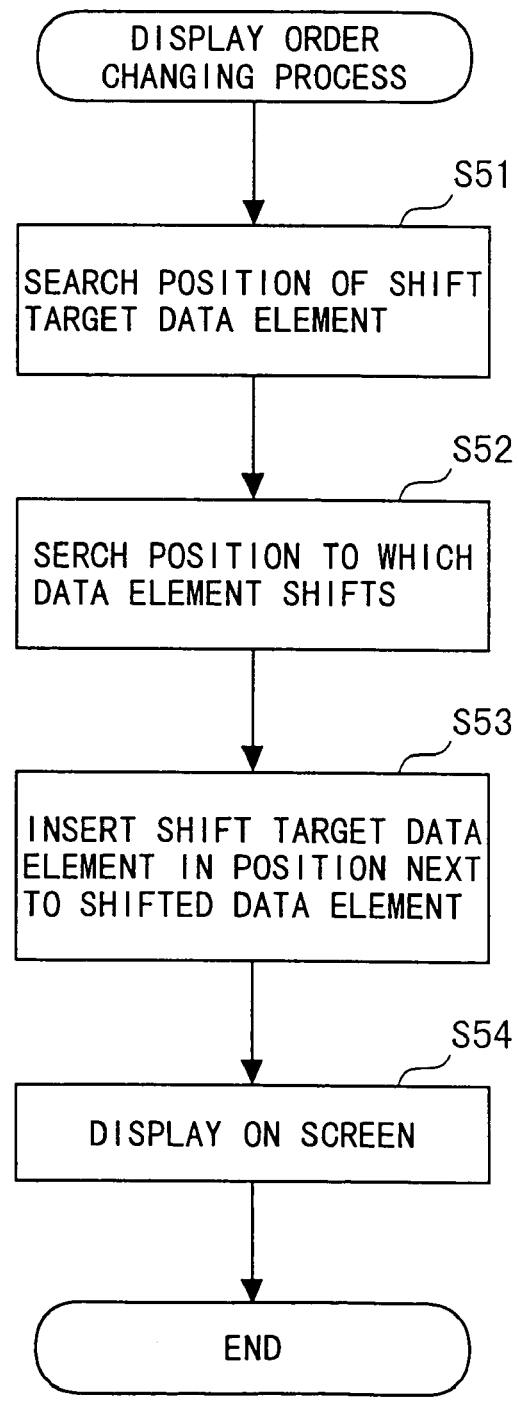
FIG. 13 is a flowchart (4) showing the processes of the control program.

FIG. 13 shows the display order changing process (S5 in FIG. 10). At first, the CPU 201 searches a position of a shift target data element (S51). This position is determined from a drag target frame image on the touch panel 203.

Next, the CPU 201 searches a position to which the data element shifts (S52). This position is determined from a drop position on the touch panel 203.

Subsequently, based on the list structure shown in FIG. 9, the CPU 201 moves the data element corresponding to the drag target frame image, to the position to which the data element is inserted (S53). This is because the next address 54a etc held by the data elements in the list structure are rewritten. The order of the data elements is thereby changed.

Next, the CPU 201 executes the memory operation shown in FIG. 8, and the frame images after the display order changing process are displayed (S54).

As discussed above, the image photographing system in the first embodiment is constructed so that the photographing target image and the image data (still image) generated from the image by the photographing process, are displayed on the same screen, thereby eliminating the necessity of switching between the photographing process and the browsing of the photographed image data. This enhances a usability.

Further, in the image photographing system in the first embodiment, when the user instructs the photographing, the frames in the photographed image display frame area 23 are shifted, and the photographed image is displayed in the tail frame therein. Accordingly, the user is able to confirm the photographed result without effecting again the switchover to a thumbnail screen.

Moreover, in the image photographing system in the first embodiment, the frame images in the photographed image display frame area 23 simulated to the real film are shifted, and thereafter the frame image photographed fresh is added. Therefore, the user is able to really sense the photographing itself.

According to the present invention, the newly added image is inserted as the last frame image among those displayed at the present on the touch panel 203. Therefore, even in the case of managing the multiplicity of images enough not to be displayed on one screen, the newly added image can be confirmed.

Moreover, in accordance with the first embodiment, the desired piece of image data can be easily shifted based on the desired display order by the drag & drop.

<Modified Example of New Data Adding Process>

In the embodiment discussed above, the frame images are shifted in the left direction in the photographed image display frame area 23 when in the new data adding process, and the newly photographed image is displayed in the image display frame 32c provided at the right end thereof. The present invention is not, however, limited to this mode.

The newly photographed image may be inserted in the position of a central image display frame area 32b, and the existing frame images displayed in the image display frame area 32b may be shifted in either the right direction or the left direction.

Furthermore, the newly photographed image may be displayed in the image display frame 32a at the left end by shifting rightward the existing frame images displayed in the image display frames 32a, 32b.

Further, the data elements in the list structure may be added and rewritten so that the image data as a basis of the frame image displayed in the image display frame 32c at the right end is arranged next to the newly photographed image by displaying the newly photographed image in the image display frame 32c at the right end.

In any case, the next address held by the related data element in the list structure may be set by updating in accordance with the insert position of the newly photographed image and with the direction in which existing frame images are thereby shifted.

Further, the number of the frame images in the photographed image display frame area 23 may not necessarily be 3 and may be an arbitrary number of 1 or greater. The number of frame images displayable in the photographed image display frame area 23 may be determined based on a size and a resolution of the display, a display space possible of being taken as the photographed image display frame area 23, and a size of the image data obtained by the photographing. Note that it is preferable in terms of grasping the display order (arranging order) of the already-photographed images to display two or more frame images.

<Modified Example of Hardware Architecture>

In the embodiment discussed above, the image photographing system is constructed by connecting the image acquisition device 101 and the mobile terminal 200 to each other via the USB cable 300. The embodiment of the present invention is not, however, limited to this architecture. For instance, the on-screen elements (such as the image display area 21, the photographed image display frame area 23, etc) explained in the embodiment discussed above may also be displayed on a liquid crystal display of a digital camera. Further, the control program described in this embodiment may also be executed by use of a personal computer or a cellular phone as a substitute for the mobile terminal 200.

Moreover, the image acquisition device 101 may be connected to the mobile terminal 200 by use of other types of cables such as an optical fiber. Further, the image acquisition device 101 may be connected to the mobile terminal 200 by use of wireless communication devices, for example, an infrared-ray emitting unit and a light receiving unit, or a transmitter and a receiver in a radio frequency region. Each of the USB cable 300, the connecting terminal such as the optical fiber, the light receiving unit or the receiver, corresponds to an unit for inputting from an outside device.

The image acquisition device 101 provided with the CCD imaging device is used in the embodiment discussed above. The embodiment of the present invention is not, however, confined to this configuration. For instance, a MOS image sensor may be used in place of the CCD imaging device.

The image photographing system in the embodiment discussed above involves the use of the hard disk 204 as a recording unit. The embodiment of the present invention is not, however, restricted to this configuration. A variety of readable-by-computer recording mediums, e.g., a memory card using a flash memory may be usable as the recording unit.

Further, the image acquisition device 101 provided with the CCD imaging device for forming the image to be displayed in the image display area 21, is exemplified in the discussion on the embodiment discussed above. The present invention is not, however, limited to this image acquisition device 101.

For example, a picture obtained by TV broadcasting, satellite broadcasting and wireless broadcasting, a picture obtained by wired broadcasting such as on a cable TV, a picture reproduced by a video deck, and picture data transmitted by utilizing a network such as the Internet, may also be displayed in the image display area 21. Thus, a receiving device (corresponding to an outside device) corresponding to a picture delivery mode may be used in order to receive the picture from outside.

Moreover, the picture displayed in the picture display area 21 may be CG animation obtained from a reproduced result and calculating process of the picture data stored in a storage device, e.g., the memory 202 and the hard disk 204 in FIG. 2, provided in the system for executing the processing function of the present invention. Namely, the present invention is not restricted to what obtains the picture from outside the system incorporating the processing function of the present invention, and the picture generated and reproduced by the self-system may also be displayed in the picture display area 21.

<Readable-by-Computer Recording Medium>

The control program in the first embodiment can be recorded on a readable-by-computer recording medium. Then, a computer reads and executes the control program on this recording medium, whereby the computer can function as the image photographing system demonstrated in the first embodiment.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<Data Communication Signal Embodied in Carrier Wave>

Furthermore, the control program may be stored in the hard disk and the memory of the computer, and downloaded to other computers via communication media. In this case, the program is transmitted as data communication signals embodied in carrier waves via the communication media. Then, the computer downloaded with this program can be made to function as the image photographing system explained in this embodiment.

Herein, the communication media may be any one of wired communication mediums (such as metallic cables including a coaxial cable and a twisted pair cable, or an optical communication cable), and wireless communication media (such as satellite communications, ground wave wireless communications, etc.).

Further, the carrier waves are electromagnetic waves for modulating the data communication signals, or the light. The carrier waves may, however, be DC signals (in this case, the data communication signals take a base band waveform with no carrier wave). Accordingly, the data communication signal embodied in the carrier wave may be anyone of a modulated broadband signal and an unmodulated base band signal (corresponding to a case where the DC signal having a voltage of 0 is set as a carrier wave).

Second Embodiment

A second embodiment of the present invention will be described with reference to FIGS. 14 to 18.

The first embodiment discussed above has dealt with the image photographing system for creating the digital image data of the object in accordance with the photographing instruction of the user in the mobile terminal provided with the image acquisition device 101. And it has dealt with the on-screen display when managing the file stored with the digital image data, too. What will be explained in the second embodiment is a data processing device (corresponding to the data management device) for managing a general data file.

Figure 14:
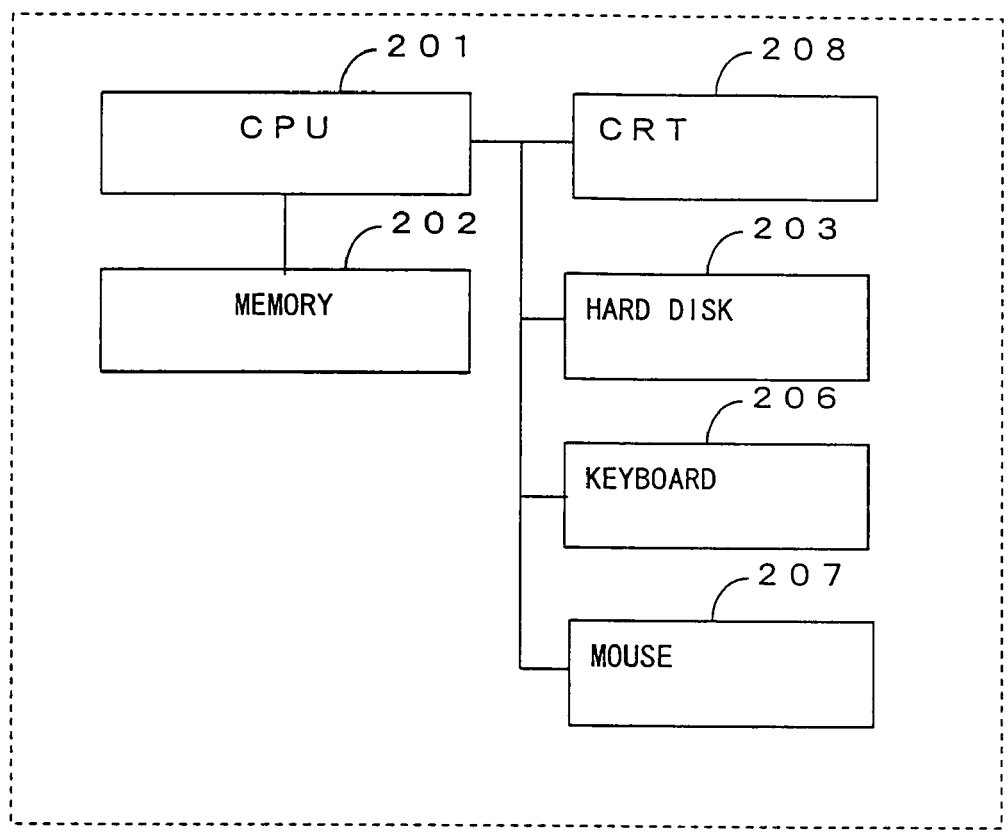
FIG. 14 is a block diagram showing a hardware architecture of a data processing device in a second embodiment.
Figure 15:
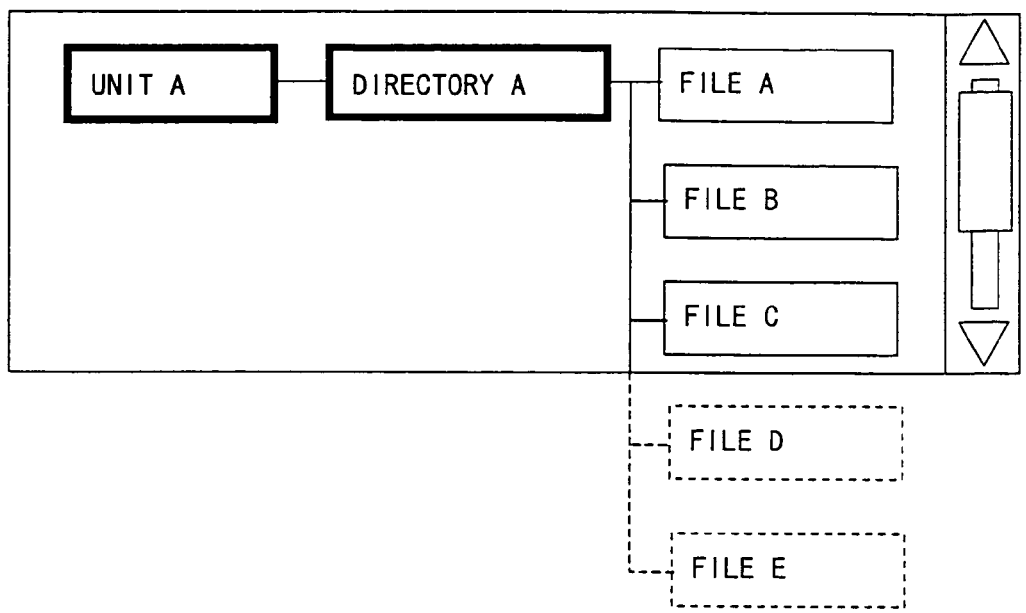
FIG. 15 is a diagram showing an on-screen architecture of a file management program.
Figure 16:
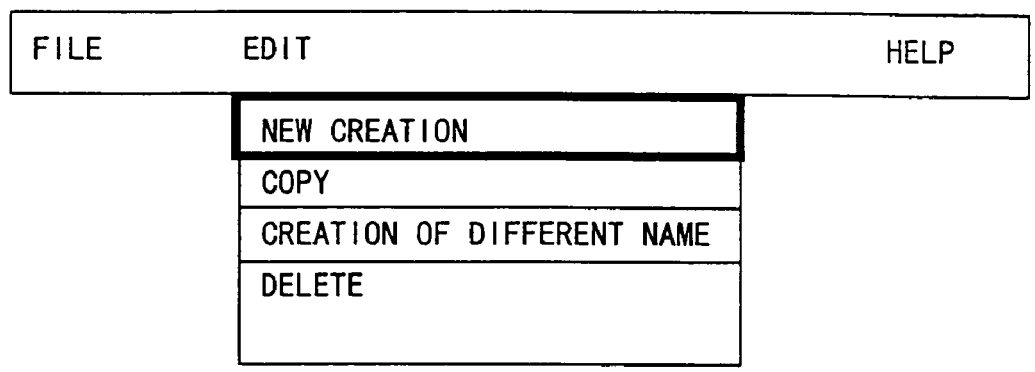
FIG. 16 is a diagram showing an edit menu of the file management program.
Figure 17:
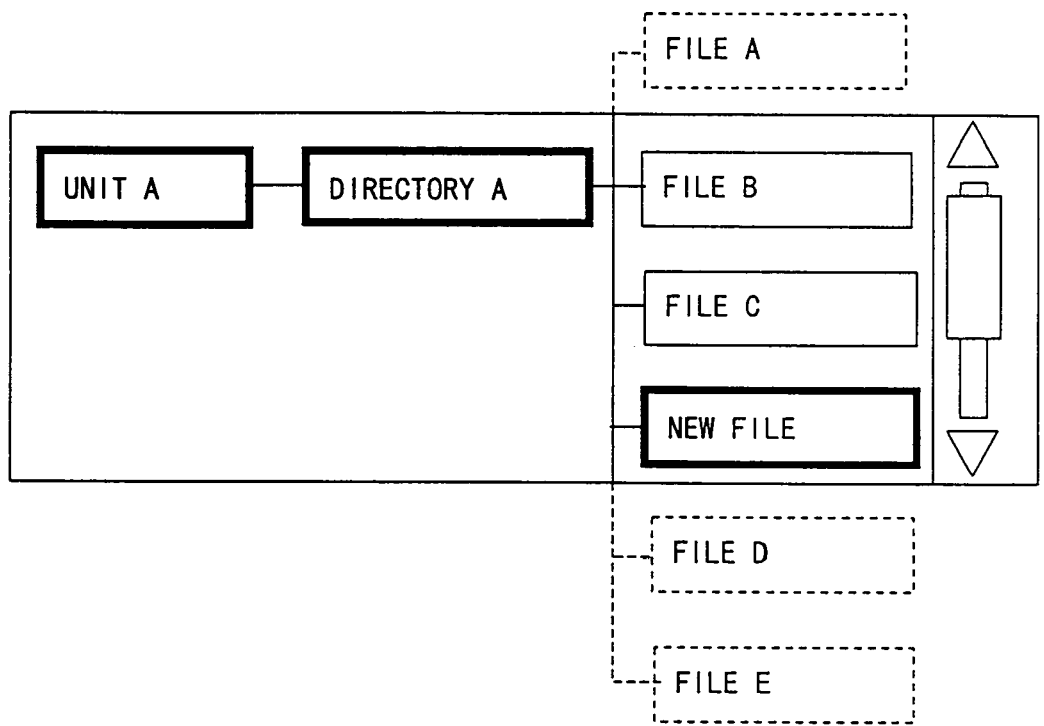
FIG. 17 is a flowchart showing a display on the screen after a new creation.

FIG. 14 is a block diagram showing a hardware architecture of the data processing device. FIG. 15 is a diagram showing an on-screen architecture of a file management program executed by the data processing device. FIG. 16 is a diagram showing an edit menu of the file management program. FIG. 17 is a flowchart showing a new creating process of the file management program.

<Architecture>

FIG. 14 is the block diagram illustrating the hardware architecture of the data processing device in the second embodiment. The data processing device has, as compared with the mobile terminal in the first embodiment, a difference in terms of having a CRT 208 and a mouse 207. Further, the data processing device does includes neither the image acquisition device 101 nor the touch panel 203. Other components are the same as those in the first embodiment. The same components in the second embodiment as those in the first embodiment are marked with the same numerals, of which the repetitive explanations are omitted. Further, the drawings in FIGS. 1 to 13 will be used for reference as the necessity may arise.

Output data from the CPU and input data from the keyboard 206 are displayed on the CRT 208.

The keyboard 206 and the mouse 207 are used when the user inputs characters and performs a menu operation.

FIG. 15 illustrates the on-screen architecture displayed on the CRT 208 when the CPU 201 of the data processing device executes the file management program. In this data processing device, the files managed by the file management program are designated at 3-tiered levels of unit, directory and file. The data management device is capable of managing a plurality of units, a plurality of directories and a plurality of files. Further, the directory may be hierarchically defined under other directories. Note that the unit embraces a physical drive and a logical drive.

Referring to FIG. 15, an unit A and a directory A framed with bold lines are now set as operation targets. Accordingly, referring again to FIG. 15, there are displayed files A, B and C that are defined by the directory A within the unit A. Other files D, E exist in the directory A but are invisible under the screen.

FIG. 16 shows an edit menu of this file management program. The edit menu is provided with items such as new creation, copy, creation of different name, and delete.

"New creation" indicates that a new file is created in the directory set as the operation target at the present. The file with a null content is thereby created.

"Copy" implies that the existing file is copied, and a new file is created.

"Creation of different name" indicates that the file name of the existing file is set different.

"Delete" shows that the operation target unit or directory or file is deleted.

Referring to FIG. 16, "new creation" is now being selected.

FIG. 17 shows a result of executing "new creation" in the display state shown in FIG. 15. According to the file management program in the second embodiment, a newly added file is inserted in a tail of the file list displayed on the screen.

Hence, when the new file is added to the file list shown in FIG. 15, the file A, as illustrated in FIG. 17, becomes invisible above the screen. Then, the file B is displayed in the position of the file A, and the file C is displayed in the position of the file B. Thus, the newly created file is displayed at the lower end on the screen.

The file management conducted in this way can be, as in the first embodiment, actualized based on the list structure illustrated in FIG. 9.

<Function and Effect>

Figure 18:
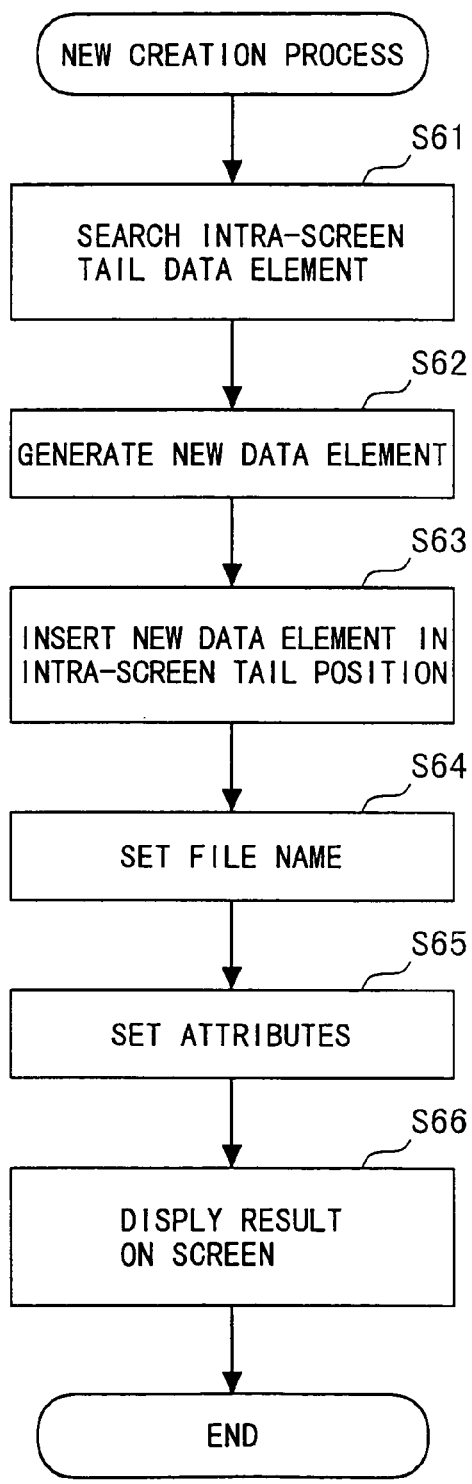
FIG. 18 shows a new creation process.

FIG. 18 shows a new creation process. The CPU 201, when detecting a menu operation (selection of "new creation") of the user, boots this new creation process.

In the new creation process, to begin with, the CPU 201 obtains from the list structure the file existing at the lower end on the screen among the files displayed (S61). This data element can be obtained from the intra-screen tail address 53 in FIG. 9.

Next, the CPU 201 ensures a region for a new data element on the memory 202, and generates the new data element (S62).

Subsequently, the CPU 201 inserts this new data element next to the intra-screen tail data element obtained above (S63).

Next, the CPU 201 requests the user to input a name of the new file. Then, the CPU 201 sets the inputted file name in the new data element (S64). Further, attributes such as a data of create etc are set in this new data element (S65).

Further, the intra-screen head address 52 and the intra-screen tail address 53 in FIG. 9 are advanced element by element, and a result of this is displayed on the screen (S66). The display in FIG. 15 is thereby changed to the display in FIG. 17.

"New creation" has been described so far, however, the function of the file management program is the same with "copy".

As discussed above, according to the second embodiment, when the file becoming a new management target is added to the data processing device, this file (or a different name of the file) is inserted in the position displayed on the screen, and hence the result of adding the management target can be easily confirmed.

<Modified Example>

In the embodiment discussed above, the files displayed are shifted file by file in the upper direction on the screen when in the new addition process (with, e.g., the file A concealed), and the newly created file is added at the lower end on the screen. The embodiment of the present invention is not, however, limited to this processing mode. For example, the shifting direction may be set opposite (downward on the screen) to the direction in FIG. 17).

Moreover, the newly created file may be inserted in any one of the positions of the files A, B and C.

What is claimed is:

1. An image photographing system, comprising:
   a display unit displaying a screen configured by a first display area displaying an image from an image acquisition device, and a second display area displaying a sequence of images;
   a detecting unit detecting a photographing instruction; and
   a generating unit generating image data from the image when detecting the photographing instruction,
   wherein the screen includes a number display area displaying a number of the generated image data, and
   the image photographing system comprises a renumbering unit renumbering the number of the generated image data responsive to an operation command relocating an order within the sequence of images.

2. The image photographing system according to claim 1, wherein the image acquisition device is a device outside of the image photographing system.

3. The image photographing system according to claim 2, wherein
   the image acquisition device includes a button acquiring the image, and
   the display unit includes a touch panel detecting a user's operation thereto and the screen comprises a button generating the photographing instruction responsive to the user's operation to the touch panel as substitute for the button of the image acquisition device.

4. The image photographing system according to claim 1, wherein the second display area includes the number display area.

5. The image photographing system according to claim 1, wherein the second display area simulates a configuration of a real film including a sequence of frames of the images, side belt parts along both sides of the sequence of the frames, and partitions dividing a frame from a next frame.

6. The image photographing system according to claim 1, wherein the display unit comprises a touch panel detecting a user's operation thereto and the screen comprises a button generating the photographing instruction responsive to the user's operation to the touch panel.

7. A computer-readable storage medium embodying a program of instructions causing a machine computer to perform operations, comprising:
   displaying a screen configured by a first display area displaying an image from an image acquisition device, a second display area displaying a sequence of images, and a number display area displaying a number of the images;
   detecting a photographing instruction;
   generating image data from the image when detecting the photographing instruction;
   updating a display of the number display area to the number of the generated image data responsive to the generating of the image data; and
   renumbering the number of the generated image data responsive to an operation command relocating an order within the sequence of images.

8. The computer-readable storage medium readable by a machine embodying the instructions executable by the machine according to claim 7, wherein the image acquisition device is a device outside of the machine.

9. An image photographing method, comprising:
   detecting a photographing instruction;
   displaying a screen configured by a first display area displaying an image from an image acquisition device, a second display area displaying a sequence of images, and a number display area displaying a number of the images;
   generating image data from the image when detecting the photographing instruction;
   updating a display of the number display area to the number of the generated image data responsive to the generating of the image data; and
   renumbering the number of the generated image data responsive to an operation command relocating an order within the sequence of images.

10. The image photographing method according to claim 9, wherein the image acquisition device is a device outside of a device which performs the method.

11. A computer readable storage medium storing a program executable by a computer connected with an image acquisition device to perform operations, comprising:
   providing a first display area displaying an image from the image acquisition device, providing a second display area displaying a sequence of stored image data, and providing a number display area displaying a number of the stored image data;
   acquiring the image from the image acquisition device and generating image data related to the acquired image,
   wherein the generated image data is automatically stored at a selected position of the displayed sequence of stored image data in accordance with a user's instruction when the image is acquired, and a display of the number display area is updated to the number of the stored image data responsive to the generating of the image data, and
   the number of the generated image data is renumbered responsive to an operation command relocating an order within the sequence of images.

* * * * *

UNITED STATES PATENT AND TRADEMARK OFFICE
CERTIFICATE OF CORRECTION

PATENT NO. : 7,474,348 B2
APPLICATION NO. : 09/788387
DATED : January 6, 2009
INVENTOR(S) : Makoto Suzuki et al.

It is certified that error appears in the above-identified patent and that said Letters Patent is hereby corrected as shown below:

On the title page, item [75]:
First Page, (Inventors), Line 2, change "Kawasaka" to --Kawasaki--.

Signed and Sealed this

Twenty-fourth Day of March, 2009

JOHN DOLL
*Acting Director of the United States Patent and Trademark Office*